UNITED STATES PATENT OFFICE.

ABEL JEAN MARTIN, OF PARIS, FRANCE, ASSIGNOR TO R. ONFFROY DE VÉRÈZ, OF SAME PLACE.

COMPOSITION FOR FIREPROOFING AND OTHER PRESERVATIVE PURPOSES.

SPECIFICATION forming part of Letters Patent No. 331,312, dated December 1, 1885.

Application filed December 24, 1884. Serial No. 151,130. (No specimens.)

*To all whom it may concern:*

Be it known that I, ABEL JEAN MARTIN, of Paris, France, have invented certain new and useful Improvements in Compounds for Fireproofing and other Preservative Purposes, of which the following is a full, clear, and exact description.

This invention has for its object the better protection of different combustible bodies or materials from fire, and for preserving substances from fermentation, putrefaction, the ravages of insects, &c.

My invention consists in a composition, with glycerine, of ammoniacal salts and fire-resisting or preservative substances, substantially such as hereinafter described and claimed.

There are several forms of ammoniacal salts that may be used in carrying out my invention, and also a variety of substances that have fire-resisting, fire-extinguishing, or preservative qualities that may be used.

I will here give an example of my invention and describe one method of its production by which very useful results are obtained; but it is to be understood that I do not limit myself to the substances herein named for use in connection with the glycerine, as various other substances may be employed.

In preparing my improved compound I prefer to use pure glycerine having a density of 28° Baumé. Thus I take, for instance, two parts, by weight, of glycerine, one part of carbonate of ammonia, eight parts of hydrochlorate of ammonia, eight-tenths of one part of soluble cream of tartar, eight-tenths of one part of oxalate of potash, eight parts of boracic acid, water in sufficient quantity. These substances, the proportions of which may be more or less changed, according to the requirements of the intended use, are thoroughly incorporated, preferably by boiling, and the compound is then ready for use.

Articles may be treated with the compound by being simply dipped therein; or the compound may be applied to the articles in any other suitable manner.

When the compound is not intended for immediate use, or is to be transported or preserved, its contained water may be evaporated by heat, and by this evaporation I produce a compound salt, which I term a "glycero."

When said evaporated compound is to be used, all that is necessary is to restore to it a sufficient quantity of water to replace the amount lost by evaporation. I prefer to use warm or boiling water for this purpose.

By treating different bodies with this compound salt or solution they are made noninflammable, and are also protected against decay.

The application of the compound is varied. For rendering uninflammable light tissues which require a dressing, including muslins, tarlatans, laces, silks, &c., I use the compound in solution of a density of, say, 8° Baumé, and add to the compound, if desired, glutinous, gelatinous, or albuminous substances, and afterward squeeze, without wringing, and subsequently dry the material, previous to ironing it. Tissues thus prepared preserve all their flexibility and whiteness or color, and are absolutely non-inflammable so long as they are not bucked. If bucked, it is necessary to steep them anew in the solution.

My compound is also applicable for tissues which require no dressing, likewise for all kinds of cloth for garments, and for readymade garments, for hangings, sackcloth, ticking, baggage, cordage, life-preserving clothing, linen, hemp, or cotton thread, various decorations, printed calicoes, &c. Printed, written, or plain papers may also be preserved and made fire-proof by steeping them in it. Paperpulp may likewise be treated with the compound. Wood treated with the compound is rendered incombustible, and is also rendered more resistant to chemical actions that might occur between its elements and external agents, and the compound, reacting upon the nitrogenized matter, destroys ferments and prevents rotting and the invasion of insects.

Doors, windows, &c., may be rendered noninflammable by the application to them, in the form of paint, cement, or varnish, &c., of my compound and any other desirable substances mixed with it.

In my said compound the ammoniacal salts in connection with the glycerine have a certain amount of fireproofing property and an incasing or enveloping action on the bodies or materials to which the compound is applied, while the cream of tartar, oxalate of potash, and boracic acid have also a fireproofing, fire-extinguishing, and preservative action, and the glycerine, while it permits the fusible salts under the action of heat or fire disengaging incombustible gases, prevents the efflorescence or dissipation of the fire-resisting, fire-extinguishing, and preservative salts or substances.

Tartaric acid or lactic acid may be substituted for the cream of tartar in the compound and the oxalate of potassa be omitted, if desired. A phosphate of soda also may be used, or a tungstate or a borate or boric acid or a silicate be substituted for it, and any other salt of ammonia whatever be substituted for the hydrochlorate of ammonia.

For some purposes only certain of the ingredients named for the compound may be used. Thus the compound might be restricted to a simple mixture of glycerine and ammoniacal salts by taking, for instance, one part, by weight, of carbonate of ammonia, eight parts of hydrochlorate of ammonia, and two parts of pure glycerine of a density of 28° Baumé, the whole to be mixed with sufficient water for use, or to be boiled in water and evaporated to form a compound salt for transportation, which may afterward be mixed with water for use as required, as before described.

To treat a fabric with this salt or liquid compound, a sufficient amount of said salt or solution is brought to a temperature of from 35° to 40° Baumé and the fabric dipped therein and afterward dried in any suitable manner. A fabric so treated will be rendered temporarily fire-resisting and will be very useful for many purposes—such, for instance, as fabrics only exposed to a flashing fire. Again, where the compound is required to be of a preservative as well as of a temporary fire-proof character, then, instead of using the ammoniacal salts with the glycerine, as above stated, the following ingredients as a compound may be used, viz: soluble cream of tartar, eight-tenths of one part; oxalate of potash, eight-tenths of one part; boracic acid, eight parts, and glycerine of a density of 28° Baumé, two parts, the whole to be mixed with water and boiled and evaporated to form a transportable salt, ready for use, and which is composed of the glycerine and the fire-resisting and fire-extinguishing substances named.

This compound is or may be used by dissolving it in water heated from 35° to 45° Baumé, in which solution a fabric to be treated may be dipped.

This compound or solution is not only a preservative one, but also fireproofing, though not entirely permanently so. It is, however, in the use with the glycerine of the ammoniacal salts and one or more of the fire-resisting and preservative substances specified that the best results are obtained, for I thus produce a glycero; or a mixture is produced which shall be permanently fire-resisting or fireproofing, protective against dampness, and serving to preserve the articles or bodies to which the compound is applied from fermentation, putrefaction, and the ravages of insects in case the articles or bodies are of a nature liable to such injuries.

Applied to fabrics, such double compound is not only innocuous to use, but it will neither affect their color nor injure their texture, and, if desired, the same may be used by adding a suitable quantity of water, directly or by injection, for extinguishing fires.

My said composition may be used in liquid form as a fire-extinguisher by diluting it with water, in which form it may be thrown upon the fire by pump or other device; or the diluted liquid may be stored in bottles and liberated upon the fire by breaking the bottles.

I am well aware that many of the preservative substances I have herein mentioned have before been used for the purpose of preserving and rendering objects fire-proof, and I therefore make no broad claim to their employment.

The distinctive feature of novelty in my invention is the use or employment of the glycerine in connection with said substances, by means whereof far better results are obtained, and all classes of objects to which my improvement is applied are more thoroughly and effectively preserved and protected; but I assert no claim to a hand-grenade fire-extinguisher consisting of a sealed shell containing a solution to remain liquid at a temperature of about or below zero Fahrenheit; nor, broadly, to all solutions useful for fire-extinguishing purposes which contain as elements glycerine and an ammoniacal salt.

Having thus described my invention, what I claim as new, and desire to secure by Letters Patent, is—

1. A compound for fireproofing and other preservative purposes made substantially as described.

2. In a compound for fireproofing and other preservative purposes, a composition of glycerine, carbonate of ammonia, hydrochlorate of ammonia, soluble cream of tartar, oxalate of potash, and boracic acid, or their equivalents, substantially as set forth.

3. In a compound for fireproofing and other preservative purposes, the combination, with glycerine, of soluble cream of tartar, oxalate of potash, and boracic acid, substantially as specified.

ABEL JEAN MARTIN.

Witnesses:
EDGAR TATE,
EDWARD M. CLARK.